July 29, 1958 R. E. C. FREDRICKSON 2,845,368
DEXTRINIZATION PROCESS
Filed May 27, 1954
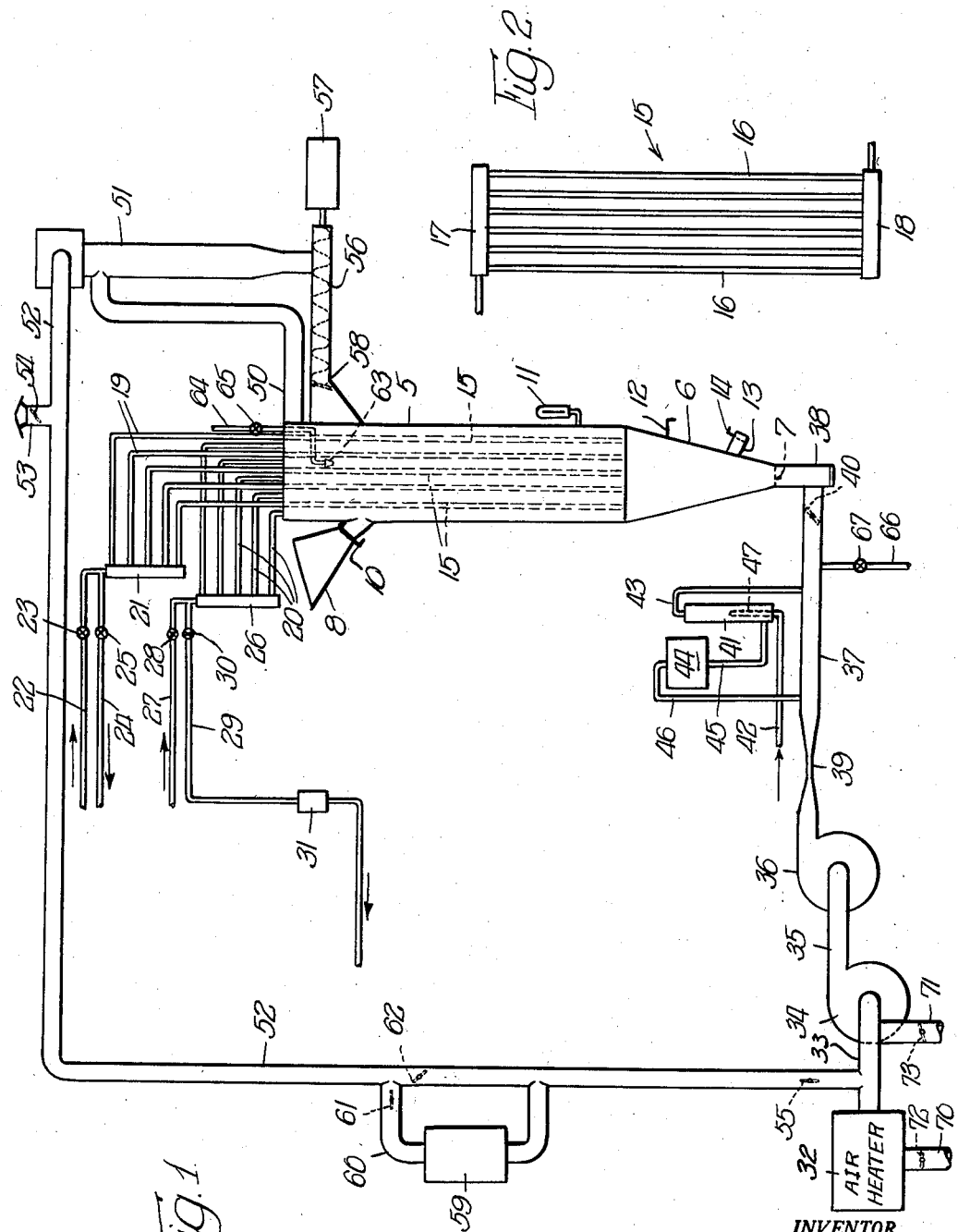
INVENTOR.
Ralph E. C. Fredrickson,
BY
Cromwell, Greist + Warden
Attys

United States Patent Office 2,845,368
Patented July 29, 1958

2,845,368

DEXTRINIZATION PROCESS

Ralph E. C. Fredrickson, Decatur, Ill., assignor to A. E. Staley Manufacturing Company, Decatur, Ill., a corporation of Delaware Application May 27, 1954, Serial No. 432,653

16 Claims. (Cl. 127—38)

This invention relates, generally, to improvements and innovations in the production of dextrins from starch. More particularly, the invention relates to the production of dextrins from starch when it is in a fluidized condition.

Dextrins are manufactured from starch by heating dry starch, alone or in the presence of various catalysts, until a desired change in properties, i. e., conversion, has been achieved. Chemically, dextrinization is a process for the depolymerization of the starch molecules. There are several types of dextrin produced commercially, depending upon the particular method of manufacture involved. When starch is heated dry with no catalyst added, the resulting dextrin products obtained are usually referred to as "British gums." Most dextrins are manufactured with the use of a small amount of an acid catalyst such as hydrochloric acid. Basic catalysts may also be used in the production of dextrins by the dry method.

Conventional processes for producing dextrins commercially have remained in use for a number of years, without material change. In general, these commercial processes are of a batch nature and involve heating dry starch in mechanically agitated vessels which are equipped with various heating arrangements. Patent No. 2,332,345, dated October 19, 1943, makes reference to four general types of dextrin cookers which have been used to carry out the conventional batch dextrinization process. While a number of special dextrin cookers and processes have been proposed, the fact remains that the bulk of the dextrin production is still produced by essentially a conventional batch process in essentially a conventional dextrin cooker.

The conventional batch dextrinization process is inherently very slow and inefficient. If the starch is heated too rapidly, the moisture evolved condenses on the starch and the entire batch will be quickly transformed into a hard glassy mass which has to be removed from the dextrin cooker by digging and chiseling. Hence, the practice is to heat each batch of starch very slowly until its temperature is gradually raised to a point where the starch is dry and converted to a dextrin. Even after the dextrinization is complete, considerable cooling times are required because of the limited cooling surfaces and low heat transfer coefficients of the equipment used. The conventional batch process takes from 3 to 24 hours depending primarily upon the type of dextrin prepared.

It was determined by means of suitable experiments that the dextrinization reaction itself is not inherently a slow reaction, but, on the contrary, is a surprisingly rapid one. Thus, when properly acidified dry starch powder was spread in a thin layer on a preheated metal plate and immediately covered with a similarly heated plate, it was found that substantial conversion, i. e., dextrinization, occurred in as little as 30 seconds. Therefore, it was evident from these experiments that it was at least theoretically possible to produce dextrins in a very short period of time if suitable means could be provided whereby the temperature of the starch could be quickly raised to the desired dextrinizing temperatures and then quickly cooled after dextrinization.

It was unexpectedly discovered according to the present invention that the dextrinization process could be carried out very practically and quickly in a fraction of the usual time by drying, converting and cooling starch while in a fluidized condition. By employing this technique it was possible to design equipment whereby the heat transfer would be such that the starch could be quickly heated and cooled without charring or other damage and at the same time the moisture evolved from the starch could be vented or removed sufficiently fast so as to avoid local condensation and resultant formation of balls or lumps. Originally, it had not been considered practical to fluidize starch since theoretically this would be impossible on the basis of Stokes' law. Thus, according to Stokes' law the settling rate of the largest starch cell (i. e., 20 microns) would be about 0.056 feet per second. Theoretically, with velocities of fluidizing gas at or above this value the starch would be blown out of the vessel. However, contrary to what should have been expected, it was discovered that gas velocities even ten times as great as the Stokes' law maximum would not result in undue amounts of starch being blown from the vessel. By means of experiment it was ascertained that the gas velocities required for uniform fluidization and also for satisfactory moisture venting or removal of moisture from the starch did not blow or convey excessive amounts of starch out of the vessel, Stokes' law to the contrary notwithstanding. Furthermore, most of the starch entrained at the higher velocities could be easily separated and returned. By re-cycling the fluidizing gas, all of the entrained starch would be returned to the bed.

These unexpected findings were verified first with laboratory apparatus wherein it was found possible to uniformly dextrinize a batch of starch by the fluidization technique in a matter of 10–20 minutes, depending on the degree of dextrinization desired. Thereafter semi-commercial production apparatus was designed and successfully operated for the manufacture of dextrins by the fluidization technique of this invention. It was established therein that the process could not only be carried out rapidly but also very uniformly and that it was highly flexible with regard to the addition of acid or other catalyst, drying, neutralizing, moisture-conditioning, and blending of small amounts of other ingredients such as borax. Therefore, as a net result of the invention, it is entirely possible to effect very large economies in the initial cost of a dextrinizing plant, and to produce an improved quality of dextrin of any desired type or grade. Because the process is easily controlled, and fire and explosion hazards can be reduced to a minimum, the process may be carried out very efficiently with a minimum of supervision and operating expense.

The term "fluidization" or the expression "fluidized condition" is commonly understood in the chemical processing art to refer to and designate that condition in which a powdered or granulated material is suspended by means of passing a gas upwardly therethrough at appropriate velocity whereby the body of powdered material resembles in appearance and for many purposes a true fluid or liquid. The fluidization technique has been applied rather extensively in the petroleum refining industry wherein various catalysts in the form of fine dry powders are fluidized in columns and gases and vapors are passed therethrough so as to obtain chemical reactions therebetween which are catalyzed by a fluidized catalyst. In that particular process the fluidized condition makes it possible to obtain an extremely high degree of contact between the catalyst and the reactant gases or vapors. The fluidization technique has also been applied quite extensively in the processing of pulverized coal in order to distill off volatile matter from fluidized beds of powdered coal.

While the fluidization technique has been used for a number of years and has even been highly developed in connection with certain chemical process industries, it has not been applied to the treatment of starch and more particularly it has not been used in connection with the production of dextrins from dry starch.

Accordingly, a general object of this invention is the successful application of the principle or phenomenon of fluidization or the fluidized condition to the treatment and handling of starch.

A more specific object of this invention is the production of dextrins from starch by carrying out the dextrinization or conversion of the starch while it is in a fluidized condition.

Another object of the invention is the improvement and innovation in the manufacture of dextrins from starch wherein dextrinization catalysts in vapor form may be added to the starch at any desired starch temperature while the starch is in a fluidized condition, thus eliminating the usual black specks of acid-charred starch and permitting the dextrinization reaction to occur in part or entirely under substantially anhydrous conditions.

Another object of this invention is the improvement and innovation in the manufacture of dextrin from starch wherein at least a portion of the dextrinizing reaction may be effected under conditions in which substantial quantities of steam are added to the fluidizing gas; thereby permitting the starch temperature, and the humidity of the atmosphere surrounding the starch particles to vary independently.

Another object of the invention is the improvement and innovation in the manufacture of dextrins from starch which facilitates carrying out a portion of the dextrinizing reaction under temperature and humidity conditions favorable to high solubility and viscosity stability followed by a reaction period at lower temperatures and higher humidities to effect further viscosity reduction with a minimum of color formation.

Another object of the invention is the improvement and innovation in the manufacture of dextrins from starch wherein the starch may be dried, acidified, dextrinized, neutralized, cooled, conditioned with respect to moisture content, and blended with an addition agent such as borax, while it is maintained in a fluidized condition.

Another object of the invention is the provision of suitable apparatus and methods of operation for producing dextrins from starch by a fluidization technique and wherein the apparatus and process are adapted to also dry the starch, add any catalysts, neutralizing agents, or other treating reagents that may be desired, cool the starch, humidify it, and blend it with any minor ingredients such as borax.

Another object of the invention is a continuous method of dextrinizing starch in the fluidized condition and for carrying out ancillary treatments of the starch including, drying, adding catalyst, neutralizing, moisture-conditioning, cooling and blending.

Another object of the invention is the re-cycling of all or part of the fluidizing gas used in dextrinizing starch in the fluidized condition so as to return entrained starch to the fluidized bed, make it economical to use an inert gas for fluidizing during all or part of the process, and greatly reduce dust and fire hazards at high temperatures. In achieving this object, moisture may be removed or added to the re-cycled gas, the gas may be heated or cooled and various treating and addition agents may be incorporated in the re-cycled fluidizing gas such as catalysts, neutralizing agents, fillers, etc.

Another object of the invention is a batch or continuous method of drying or re-drying starch while in a fluidized condition.

Another object of the invention is a continuous method of drying or re-drying starch wherein a bed of fluidized starch is maintained, and starch having a moisture content in excess of the amount at which the starch can be fluidized is added to the bed and compensating amounts of starch are withdrawn from the bed.

Another object of the invention is the use of a fractional percent of calcium phosphate to restore fluidizability to starch containing oil. Another object is to reduce the bulk density of fluidized starch by addition of a small amount of calcium phosphate.

Still another object of the invention is the production of dextrins from starch by a fluidization technique whereby the investment in apparatus and plant, and the operating expense thereof are reduced manyfold over present requirements, the rate of production is speeded up many times, and the process is made much more flexible and easier to control.

Still another object of the invention is the employment of fluidization techniques to produce dextrins from starch having improved uniformity and any predetermined combination of properties or characteristics over a wide range.

Certain other objects of the invention will, in part, be obvious, and will, in part, appear hereinafter.

For a more complete understanding of the nature and scope of the invention, reference may now be had to the following detailed description thereof taken in connection with the accompanying drawing, wherein:

Fig. 1 is a diagrammatic view of apparatus suitable for practicing the invention on a commercial production basis; and Fig. 2 is a side elevational view of one of the heating coils or plates disposed in the vessel in the apparatus in Fig. 1 wherein a bed of starch is fluidized.

Referring now to the drawing, a vertical cylindrical vessel is designated at 5 and it is in this that the starch is fluidized and the dextrinization and related steps conducted. The bottom of the vessel 5 is provided with a conical section 6 at the bottom of which is located a perforated aeration plate or grate 7. In one construction, which proved to be very satisfactory in operation, the vessel 5 had a diameter of 3 feet and a height of 13 feet. The conical section 6 had a height of 5.51 and tapered from the 3 foot diameter at the top to a diameter of 8 inches at the bottom. The aeration plate 7 was provided with forty-one ⅜ inch holes suitably arranged so as to give an equal distribution of the fluidizing gases passing upwardly therethrough.

Starch and other desired materials are charged into the vessels 5 through a charging hopper 8 located adjacent the top of the vessel. The hopper spout is provided with a slide type valve 10 which remains closed except when the vessel 5 is being charged. It will be appreciated that other types of feeding arrangements could be used, including those with air locks or screw conveyors so that materials may be fed into the vessel 5 without shutting off the fluidizing gas.

The vessel 5 is provided with an indicating thermometer 11 and may be provided with other suitable equipment such as pressure gauges, sight windows, and, if desired, various automatic recording devices for recording temperatures, pressures and humidities. A sampler 12 is provided in the side of the conical section 6 whereby small samples of the contents of the dextrinizer may be removed from time to time for testing. The conical section 6 is also provided adjacent the bottom thereof with a packing-out or discharge spout 13 provided with a suitable slide valve 14 which will be normally closed and will be open when the contents of the vessel are being discharged into bags or other suitable containers.

In order to heat the fluidized starch within the vessel 5 during the drying and dextrinizing steps, and to subsequently cool and condition it, a plurality of heat exchangers 15—15 are suitably mounted within the vessel 5. Each of the heat exchangers 15 may be flat and generally rectangular in form and made up of a number of vertical tubes 16 (Fig. 2) joined together at the top starch and bring the starch up to a temperature of 360° F. in less than an hour's time depending upon the pressure of the steam, whereas in an efficient type of conventional dextrinizer it requires between 6 to 8 hours to reach the same temperature. In addition, the cooling rate is equally fast and it is possible to cool the dextrinized starch in fluidized condition down from 300° F. to a temperature of 180° F. in approximately 9 minutes whereas to cool the starch in a conventional dextrinizer through the same temperature range requires ten times as long, i. e. 90 minutes.

Furthermore, if it is necessary to blend or mix any additional ingredients such as borax in with the dextrin, uniform blending may be obtained very quickly in a matter of only a minute or two as against a much longer time required in ordinary mixing equipment.

In general, it is possible to carry out complete dextrinizing processes in the apparatus shown and described in connection with Fig. 1 of the drawing in about 1½ to 4 hours, which would require 6 to 12 hours to carry out in a conventional batch-type dextrinizer or dextrin cooker. By increasing the heating surfaces in the vessel 5, which can be done practically and economically, the conversion time can be reduced to a few minutes for dextrins requiring 6½ to 8 hours in conventional equipment. This again brings out the fact that the dextrinizing reaction is itself a rapid one and that the very prolonged times required with conventional equipment are due to limitations imposed on the rate of applying heat to the starch. This limitation, in turn, is due to the inability to vent or remove the moisture as rapidly as it is evolved from the starch and the practical difficulties involved in extensively supplementing the jacketed heat transfer surfaces of mechanically agitated vessels.

According to careful calculations, it has been found that by using the fluidizing process of this invention, it is possible to effect about an 8-fold reduction in building volume and about a 4 to 5-fold reduction in equipment investment. In addition, the operating cost per unit of dextrin produced is reduced many fold. Added to these economic advantages is the greatly increased flexibility made possible and the improvement of product achieved through this flexibility and the fine degree of control which is made possible.

It will be apparent to those skilled in the art that a number of modifications may be made in the fluidizing apparatus and mode of operation thereof as described above and shown in the accompanying drawing. With respect to the apparatus, it will be apparent that the vessel 5 can be provided with a heating jacket in order to add additional heating surfaces, and various designs of heat exchanger units may be used.

With regard to changes in operation, the catalyst may be added in several different forms and manners. For example, dilute hydrochloric acid may be sprayed onto the fluidized contents of the vessel 5 by means of the spray nozzle 63. Other liquid catalysts and neutralizing agents may be added in the same manner. It is also possible to employ solid catalysts and neutralizing agents. For example, instead of using ammonia gas for neutralizing, solid ammonium carbonate or bicarbonate may be added through the charging hopper 8. By providing this hopper with an air lock or star feeder, it is possible to add the neutralizing agent without discontinuing the fluidization process. These solid neutralizers become rapidly blended with the starch before they become volatilized.

The properties of the dextrins are affected by the moisture content of the fluidizing gas. Therefore, steam may be introduced through the line 66 as desired, during and/or after the drying phase and also during and/or after the dextrinizing phase. In one embodiment of the invention, corn starch was dextrinized as described above in the apparatus shown in the drawings with 60% steam by volume being added to the fluidizing gas so as to effect an additional lowering of the dextrin paste viscosity. At the end of the dextrinizing step the steam was slowly shut off and the resulting dextrin was cooled as described above.

In still another embodiment of the invention making use of the apparatus shown in the drawings, after the starch was fluidized and dried, the HCl catalyst was vaporized into the fluidized charge at 300–400° F. and the temperature held until the desired degree of conversion was obtained. The dextrinized starch was then cooled in fluidized condition to 180–275° F. whereupon it was steamed to reduce the viscosity still further. When the desired reduction in viscosity was obtained, the steam was shut off and the starch was cooled. This particular technique tends to produce lighter colored dextrins of good viscosity stability.

If desired as much as 100% steam may be used as the fluidizing gas so long as the starch or dextrin temperature remains above the dew point. Otherwise, there is condensation and attendant lump formation as described above.

The entire process may be carried out by use of an inert gas such as flue gas, or nitrogen or carbon dioxide. In this case the re-cycled gas will be passed through the cooler and condenser 59 during the drying phase in order to remove moisture from the gas and at the same time cool the gas and thereby reduce the load on the blowers 34 and 36. Instead of using inert gas throughout the entire process, air may be used during the drying phase and this will be vented to the atmosphere. When the drying phase is completed, then the system may be purged with an inert gas, after which the remainder of the process is carried out by re-cycling the gas. Even after the drying phase is completed, the re-cycled gas may be passed through the cooler 59 in order to cool the gas and thereby increase the efficiency of the blowers.

Besides blending in such additives as borax, it was discovered that the addition of a very small percent of dry calcium phosphate, or a similar material, was desirable from several standpoints. While all commercial starches that have been tried fluidized equally well, it was discovered that the addition or presence of an extremely small amount of oil on the starch (in the order of a few hundredths of 1%) substantially destroyed the fluidized ability of the starch and therefor rendered the present process completely inoperable. While it appears to be unlikely that a non-fluidizable starch would be encountered commercially because of the presence of oil, it was discovered that the condition could be easily corrected if it should arise, simply by the addition of a few hundredths of a percent of dry calcium phosphate to the starch. The exact amount of dry calcium phosphate to be added depends upon the nature of the starch and its oil content. It was also discovered that the addition of calcium phosphate had another interesting and advantageous effect in fluidized systems even where there was no oil and it does not have to be added to render the starch fludizable. Thus, it was discovered that the addition of about a fraction of a percent of calcium phosphate (e. g. 0.1% based on the weight of the starch), substantially reduced the bulk density of the fluidized starch. Therefore, it was possible to decrease the weight of fluidized starch occupying a given volume and so increase the ratio of heating surface to weight of starch. The addition of calcium phosphate also permits the use of less fluidizing air for a given weight of starch and results in a saving of power for blower operation.

In addition to its use in dextrinizing starch, it was found that the same apparatus could be used for re-drying starch. This was done by maintaining a body of heated fluidized starch in the fluidizing vessel and then feeding to it starch containing say 15% moisture. By withdrawing an equivalent amount of dried starch the drying process can be made continuous.

Where the starch fed is too wet to fluidize by itself, as for example in a cake from a centrifuge or filter, it may be pre-mixed with a portion of previously dried starch, the mixture passed through a mill to break up the lumps and to insure thorough mixing and the mixture fed to the body of heated fluidized starch. In this manner a very efficient method of continuously drying starch is made possible where the starch is too wet to be fluidized.

The term "starch" as used herein and in the appended claims is intended to include and cover not only corn starch which has the greatest commercial importance, but also other types of starch such as tapioca, sago, wheat, potato, rice, sorghum, waxy maize and others.

It will be apparent that certain further modifications and changes may be made in the apparatus and in the process of producing dextrin therein without departing from the spirit and scope of the invention.

What is claimed as new is:

1. The method of dextrinizing starch which comprises introducing a bed of starch powder into a vessel, maintaining an upward flow of gas through said bed by introducing the gas from beneath said bed and withdrawing it from an outlet above the top of said bed, the upward velocity of said gas flow being sufficient to suspend and vigorously agitate the starch particles within said bed but insufficient to convey a substantial portion of the starch out through said upper outlet, heating said bed of starch in said agitated condition to dextrinizing temperature and maintaining said dextrinizing temperature until the desired degree of dextrinization is obtained.

2. The method of dextrinizing starch which comprises introducing a bed of starch powder into a vessel, maintaining an upward flow of gas through said bed by introducing the gas from beneath said bed and withdrawing it from an outlet above the top of said bed, the upward velocity of said gas flow being sufficient to suspend and vigorously agitate the starch particles within said bed but insufficient to convey a substantial portion of the starch out through said upper outlet, heating said bed of starch in said agitated condition to dextrinizing temperature by maintaining heated surfaces within said bed, maintaining said dextrinizing temperature until the desired degree of dextrinization is obtained, and cooling said bed of agitated starch by maintaining cooling surfaces within said bed.

3. The method called for in claim 2 wherein catalyst for the dextrin conversion is vaporized and introduced into said gas.

4. The method called for in claim 2 wherein a small percent based on the weight of the starch of HCl in the form of dilute hydrochloric acid vapor is uniformly introduced into the starch in said agitated condition and wherein after the desired degree of dextrinization is obtained the dextrin conversion is arrested by the introduction of ammonia into the agitated starch in sufficient quantity of neutralize the acid catalyst.

5. The method called for in claim 2 wherein dextrinizing catalyst is sprayed onto the starch in said agitated condition.

6. The method called for in claim 2 wherein an acidic catalyst for the dextrin conversion is introduced into the starch in said agitated condition and wherein the dextrin conversion is arrested by blending into the agitated starch an alkaline material selected from the group consisting of ammonium carbonate and ammonium bicarbonate.

7. The process called for in claim 2 wherein steam is added to the gas.

8. The method called for in claim 2 wherein at the beginning of the process at least a portion of the gas withdrawn from said vessel is vented until the starch is dried and the gas withdrawn from said vessel is thereafter re-cycled during the dextrinizing and cooling phases.

9. The method called for in claim 2 wherein at least a portion of the gas withdrawn from said vessel is re-cycled and water vapor therein derived from the starch is condensed therefrom prior to return of the re-cycled gas to the bed of starch.

10. The method called for in claim 2 wherein air is initially used to agitate and suspend said starch bed and is vented after exiting from said vessel until the starch is dried and wherein thereafter inert gas is used for agitating and suspending said bed of starch and the same is re-cycled.

11. The method called for in claim 2 wherein the upward velocity of the gas is about 0.5 feet per second.

12. The method called for in claim 2 wherein the starch is heated to a dextrinizing temperature of from about 150 to 400° F.

13. The method called for in claim 2 wherein when the temperature of the agitated starch bed reaches dextrinizing temperature hydrochloric acid vapor is introduced into the gas in an amount which on a dry basis weight is equal to approximately 0.1% by weight of the starch, and wherein when sufficient conversion has been obtained ammonia gas is introduced into the gas so as to neutralize the acid remaining in the starch and arrest the dextrinizing reaction.

14. The method of making dextrin called for in claim 2 wherein said bed of starch in agitated condition is first heated to an elevated dextrinizing temperature, is then cooled to a substantially lower dextrinizing temperature and maintained at said lower temperature while said gas passing therethrough contains at least a substantial proportion of steam until a predetermined reduction in paste viscosity is achieved, and then cooling said agitated bed of starch below dextrinizing temperature.

15. The process of claim 14 wherein said elevated dextrinizing temperature is in the range of about 300 to 400° F. and said lower dextrinizing temperature is in the range of about 180 to 275° F.

16. The method called for in claim 2 wherein entrained starch dust is separated from the gas exiting from the bed of agitated starch and the separated starch returned to said bed of agitated starch.

References Cited in the file of this patent

UNITED STATES PATENTS

| | | |
|---|---|---|
| 1,564,979 | Singer | Dec. 8, 1925 |
| 1,942,544 | Fuller | Jan. 9, 1934 |
| 2,090,187 | Credo | Aug. 17, 1937 |
| 2,147,104 | Moller | Feb. 14, 1939 |
| 2,177,378 | Schorn | Oct. 24, 1939 |
| 2,180,968 | Schorn | Nov. 21, 1939 |
| 2,204,615 | Nivling | June 18, 1940 |
| 2,222,874 | Leuck | Nov. 26, 1940 |
| 2,233,243 | Burns | Feb. 25, 1941 |
| 2,235,683 | Horesi | Mar. 18, 1941 |
| 2,274,789 | Horesi | Mar. 3, 1942 |
| 2,332,345 | Rowe | Oct. 19, 1943 |
| 2,521,215 | Haddiland | Sept. 5, 1950 |
| 2,615,906 | Stanton | Oct. 28, 1952 |
| 2,698,818 | Stearkle et al. | Jan. 4, 1955 |
| 2,735,792 | Kroyer | Feb. 21, 1956 |

FOREIGN PATENTS

| | | |
|---|---|---|
| 16,362 | Great Britain | of 1914 |
| 619,404 | Great Britain | Mar. 9, 1949 |